United States Patent Office 3,527,865
Patented Sept. 8, 1970

3,527,865
METHOD OF CONTROLLING SEA LAMPREY
Robert G. Taborsky, Bedford Heights, Ohio, assignor to Ben Venue Laboratories, Inc., Pittsburgh, Pa., a corporation of Pennsylvania
No Drawing. Original application July 2, 1965, Ser. No. 469,300. Divided and this application Apr. 4, 1966, Ser. No. 539,723
Int. Cl. A01n 9/20
U.S. Cl. 424—230                    22 Claims This application is a division of applicant's copending application, Ser. No. 469,300, filed July 2, 1965 now abandoned, which was a continuation-in-part of applicant's then copending applications, Ser. No. 325,473, filed Nov. 21, 1963, now abandoned, and Ser. No. 435,686, filed Feb. 26, 1965, now abandoned, both of which were continuation-in-part applications of applicant's then copending application, Ser. No. 56,679, filed Sept. 19, 1960, now abandoned.

This invention relates to new, substituted salicylanilides, and the use thereof as sea lamprey larvicides and more particularly 3-nitrohalosalicylanilides.

The general object of this invention is to provide new, substituted salicylanilides and more particularly to provide 3-nitrohalosalicylanilides.

Other objects of this invention include the provision of a new and improved sea lamprey larvicide (*Petromyzon marinus*); the provision of a new and improved sea lamprey larvicide having a relatively wide range between those concentrations lethal to sea lamprey larvae and those lethal to desirable economic fish and aquatic life such as, for example, rainbow trout; the provision of a new and improved sea lamprey larvicide having an improved and wider safety range between lethal concentrations for sea lamprey and for economically desirable aquatic life; the provision of a new and improved sea lamprey larvicide which is safely, easily and economically used, which is positive and effective in use, and which is of improved effective selectivity for this use and purpose; and, the provision of a new improved use, method and means of controlling sea lamprey while providing unexpectedly safe tolerances and protection for economic fish and aquatic life such as, for example, rainbow trout.

Another object of this invention is to obtain one or more of the objects hereinbefore set forth.

These and other objects and advantages of this invention will become apparent from the following description of preferred forms thereof.

Broadly, the new substituted salicylanilides which are provided by this invention correspond to the following formula:

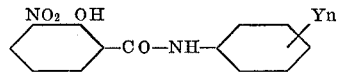

wherein Y is a halogen and $n$ is an integer no greater than 5.

The following are specific examples of new 3-nitrohalosalicylanilides provided by and embodying this invention and having corrected melting points in degrees centigrade as listed.

TABLE I

| Compound | M.P.[1] ° C. | Formula |
|---|---|---|
| 4'-fluoro-3-nitrosalicylanilide | 141.5–142 | $C_{13}H_9FN_2O_4$ |
| 2'-chloro-3-nitrosalicylanilide | 171.5–172.5 | $C_{13}H_9ClN_2O_4$ |
| 3'-chloro-3-nitrosalicylanilide | 152.5–153.5 | $C_{13}H_9ClN_2O_4$ |
| 4'-chloro-3-nitrosalicylanilide | 154–156 | $C_{13}H_9ClN_2O_4$ |
| 4'-bromo-3-nitrosalicylanilide | 158–158.5 | $C_{13}H_9BrN_2O_4$ |
| 4'-iodo-3-nitrosalicylanilide | 175–178 | $C_{13}H_9IN_2O_4$ |
| 2',4'-dichloro-3-nitrosalicylanilide | 241 | $C_{13}H_8Cl_2N_2O_4$ |

[1] Corrected.

3-nitrohalosalicylanilides embodied in this invention may be produced by a number of methods including, for example, reacting 3-nitrosalicoyl chloride with an excess of the halogenated aniline in benzene and recrystallizing or by reacting the acid, the aniline and phosphorous trichloride in benzene.

EXAMPLE I

A solution of 25 grams (0.12 mole) of 3-nitrosalicoyl chloride in 200 milliliters of benzene was added with shaking to 50 grams (0.39 mole) of para-chloroaniline in 150 milliliters of benzene. An immediate yellow precipitate formed which was allowed to stand overnight and then vacuum filtered. The solid obtained was washed with small amounts of benzene, air dried, pulverized and then stirred for thirty minutes in 100 milliliters of 10% hydrochloric acid. The product was then vacuum filtered again, washed well with water, and dried at 90° for sixteen hours to give 28.5 grams (78.5% yield) of crude 4'-chloro-3-nitrosalicylanilide, having a melting point of 153–156° C. The crude 4'-chloro-3-nitrosalicylanilide was crystallized from 600 milliliters of ethanol to give 23.0 grams of yellow needles in a first crop and additional 3.6 grams by reducing the alcohol filtrate to one-sixth, or a total of 26.6 grams of 4'-chloro-3-nitrosalicylanilide having a melting point of 154–156° C.

The other halonitrosalicylanilides provided by this invention, when prepared in accordance with the procedure of this example, were obtained in molar yields of from 71 to 93 percent.

EXAMPLE II

Similarly, 5.0 grams (0.025 mole) of 3-nitrosalicoyl chloride were reacted with 9.2 grams (0.083 mole) of parafluoroaniline for eighteen hours in benzene to give 4'-fluoro-3-nitrosalicylanilide having a melting point of 141.5–142° upon crystallizations from ethanol.

EXAMPLE III

Similarly, 5.0 grams (0.025 mole) of 3-nitrosalicoyl chloride were reacted with 10.6 grams (0.083 mole) of orthochloroaniline in benzene to give 2'-chloro-3-nitrosalicylanilide, having a melting point of 171.5–172.5° upon crystallization from ethanol.

EXAMPLE IV

Similarly, 5.0 grams (0.025 mole) of 3-nitrosalicoyl chloride were reacted with 10.6 grams (0.083 mole) of metachloroaniline in benzene to give 3'-chloro-3-nitrosalicylanilide, having a melting point of 152.5–153.5° upon crystallization from ethanol.

EXAMPLE V

Similarly, 5.0 grams (0.025 mole) of 3-nitrosalicoyl chloride and 14.3 grams (0.083 mole) of para-bromoaniline were reacted in benzene for eighteen hours to give 4'-bromo-3-nitrosalicylanilide, having a melting point of 158–158.5° upon crystallization from ethanol.

EXAMPLE VI

Similarly, 5.0 grams (0.025 mole) of 3-nitrosalicoyl chloride were reacted with 18.2 grams (0.083) of para-iodoaniline in benzene for eighteen hours to give 4'-iodo-3-nitrosalicylanilide, having a melting point of 175–178° upon crystallization from ethanol.

EXAMPLE VII

Similarly, 5.0 grams (0.025 mole) of 3-nitrosalicoyl chloride were reacted with 13.4 grams (0.083 mole) of 2,4-dichloroaniline for eighteen hours in benzene to give 2',4'-dichloro-3-nitrosalicylanilide, having a melting point of 241°.

When 2,4-dichloroaniline reacted with the nitrosalicoyl chloride, the rate of reaction was slower than with the monohaloanilines and precipitate did not start to form until about one hour after mixing and did not fill the mixture until several hours later. With the monohaloanilines, precipitation occurred immediately and satisfactory yields were obtained in about one hour after mixing.

With 2,4,6,-trichloroaniline and 3-nitrosalicoyl chloride, the salicylanilide did not form until after five days. These 3-nitrohalosalicylanilides were crystallized from ethanol.

3-nitrohalosalicylanilides provided by this invention have been found useful as larvicides for sea lamprey. In recent years sea lamprey have caused great damage to commercial fish in the Great Lakes and much money, time and effort has been expended in seeking a practical way to eradicate or control the sea lamprey without, however, causing injury or damage to commercially useful fish and other aquatic life and users of the water. Lamprey reproduce by laying their eggs in the streams which feed the lakes, and it has been proposed to control the lamprey by killing the larvae, which are hatched from the eggs, in the streams.

Such larvicides must, of course, be capable of killing the larvae, one hundred percent, in reasonable concentrations, in a reasonable time and at a rational cost and have not residual or toxic effect, as used, against human and other animals. Equally important, the difference between the concentrations of the larvicide which will be completely effective against the sea lamprey larvae and which appreciably kill economically valuable fish, should be as great as possible, so as to provide the best possible margin of safety between the two concentrations. It is desired therefore to provide more potent and selective sea lamprey larvicides.

Sea lamprey live as parasites on beneficial fish and annual losses caused the Great Lakes fishing industry by the lamprey have risen above 7.5 million dollars. In Lake Superior, alone, the annual trout harvest dropped from 47 million pounds in 1950 to 367,000 in 1961.

Certain of the above and other halonitrosalicylanilides have been tested for toxic and selective effect on sea lamprey larvae and rainbow trout. In making the tests larval sea lamprey (*Petromyzon marinus*) and fingerling rainbow trout (*Salmo gairdneri*) were exposed for 24 hours at 12° C. in battery jars containing varying concentrations in parts per millions of test compound dissolved in aerated water drawn from Lake Huron. Viability was determined at the conclusion of the test period. The effectiveness of the compound against sea lamprey larvae was determined on the basis of a one hundred percent kill. In contrast, the effectiveness of the compound against trout was determined for a concentration which would not kill in excess of 25% of a given population, since a greater kill is not considered desirable with respect to the economically valuable test fish. Preliminary screening eliminated compounds requiring a greater than 10 p.p.m. concentration in order to produce a one hundred percent kill. The concentrations necessary to produce these effects vary with the conditions under which they are used, but the tests are considered valid for determining usefulness.

5-nitrohalosalicylanilides having the formula

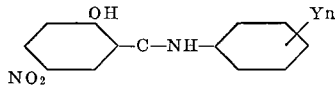

where Y is a halogen and $n$ is an integer no greater than 5 have also been prepared and tested, in accordance with the above procedure as sea lamprey larvicide. Mixtures of 3- and 5-nitrohalosalicylanilides have been similarly tested.

The following table indicates the parts per million of the respective compounds and mixtures of compounds found necessary to produce a total kill ($LD_{100}$) in sea lamprey larvae and a kill not in excess of 25% ($LD_{25}$) in rainbow trout. The activity index expresses the selectivity of the compound for lamprey larvae at $LD_{100}$ to rainbow trout $LD_{25}$ as a mathematical ratio of the concentrations necessary to produce the respective lethal effects—the larger the activity index the greater the selectivity of the compounds as a larvicide.

TABLE II

| Compound | Larvicidal LD 100 | Trout LD25 | Activity Index |
|---|---|---|---|
| 2'-chloro-3-nitrosalicylanilide | 3.0 | 7.0 | 2.33 |
| 3'-chloro-3-nitrosalicylanilide | 0.3 | 0.9 | 3.0 |
| 4'-chloro-3-nitrosalicylanilide | 0.3 | 0.7 | 2.33 |
| 2'-fluoro-3-nitrosalicylanilide | 3.0 | 3.0 | 1.0 |
| 3'-fluoro-3-nitrosalicylanilide | 0.5 | 0.9 | 1.8 |
| 4'-fluoro-3-nitrosalicylanilide | 10.0 | 10.0 | |
| 2'-iodo-3-nitrosalicylanilide | 1.0 | 3.0 | 3.0 |
| 3'-iodo-3-nitrosalicylanilide | 0.3 | 1.0 | 3.3 |
| 4'-iodo-3-nitrosalicylanilide | 0.3 | 0.7 | 2.33 |
| 2'-bromo-3-nitrosalicylanilide | | ¹ 1.0 | |
| 3'-bromo-3-nitrosalicylanilide | 0.3 | 1.0 | 3.3 |
| 4'-bromo-3-nitrosalicylanilide | 0.3 | 1.0 | 3.3 |
| 2',5'-dichloro-3-nitrosalicylanilide | 0.3 | 0.9 | 3.0 |
| 3',4'-dichloro-3-nitrosalicylanilide | 0.3 | 0.5 | 1.6 |
| 2'-chloro-5-nitrosalicylanilide | 0.9 | 3.0 | 3.3 |
| 3'-chloro-5-nitrosalicylanilide | 15.0 | 10–15 | |
| 4'-chloro-5-nitrosalicylanilide | 0.5 | 1.0 | 2.0 |
| 4'-iodo-5-nitrosalicylanilide | 0.5 | 1.0 | 2.0 |
| 4'-bromo-5-nitrosalicylanilide | 0.5 | 1.0 | 2.0 |
| 3'-chloro benzanilide | 10.0 | 10.0 | 1.0 |
| 4'-chloro benzanilide | 10.0 | 10.0 | 1.0 |
| 3'-nitrosalicylanilide | 3.0 | 3.0 | 1.0 |

¹ $LD_{100}$.

As seen in Table II, 3-nitrohalosalicylanilides not only are lethal to sea lamprey larvae but also provide efficient and effective means for controlling sea lamprey because of the unobvious and unexpected effect of 3-nitrohalosalicylanilides in providing a wide selectivity range between lethal effectiveness as against the sea lamprey larvae and as against economically desirable aquatic life, such as trout, at low larvicidal concentrations. This unexpected selectivity at low larvicidal concentrations of predetermined 3-nitrohalosalicylanilides in controlling sea lamprey vis-a-vis economically desirable fish is demonstrated in Table II not only in contrast with 5-nitrohalosalicylanilides but also in contrast with nitrosalicylanilides which are not halogenated.

It is also noted that when the halogen on the prime ring is in the two (ortho) position the larvicidal activity is less than when the halogen is in the three (meta) or four (para) position.

Modifications, changes and improvements to the preferred forms and embodiments of the invention herein depicted and described may occur to those skilled in the art who come to understand the precepts and principles thereof. Accordingly, the patent to be issued hereon should not be limited in its scope to the specific embodiments of the invention herein depicted and described, but by the advance by which the invention has promoted the art.

I claim:

1. The method of controlling sea lamprey which comprises adding to a sea lamprey larvae habitat containing sea lamprey larvae a larvicidal amount of a 3-nitrohalosalicylanilide having the formula

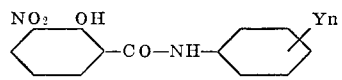

where Y is a halogen and $n$ is an integer no greater than 5.

2. The method of controlling sea lamprey as set forth in claim 1 which comprises adding to a sea lamprey larvae habitat containing sea lamprey larvae a larvicidal amount of a 3-nitrohalosalicylanilide chosen from the group consisting of 4'-chloro-3-nitrosalicylanilide, 4'-chloro-3-nitrosalicylanilide, 3'-iodo-3-nitrosalicylanilide, 4'-iodo-3-nitrosalicylanilide, 3'-bromo-3-nitrosalicylanilide, 4'-bromo-3-nitrosalicylanilide, 2',5'-dichloro-3-nitrosalicylanilide and 3',4'-dichloro-3-nitrosalicylanilide.

3. The method of controlling sea lamprey as set forth in claim 1 which comprises adding to a sea lamprey larvae habitat containing sea lamprey larvae and economically beneficial aquatic life a 3-nitro-halosalicylanilide chosen from the group consisting of 4'-chloro-3-nitrosalicylanilide, 3'-chloro-3-nitrosalicylanilide, 3'-iodo-3-nitrosalicylanilide, 4'-iodo-3-nitrosalicylanilide, 3'-bromo-3-nitrosalicylanilide, 4'-bromo-3-nitrosalicylanilide, 2',5'-dichloro-3-nitrosalicylanilide and 3',4'-dichloro-3-nitrosalicylanilide in predetermined larvicidal amounts insufficient to eradicate the economically beneficial aquatic life upon equal exposure.

4. The method according to claim 3 in which the economically beneficial aquatic life is fingerling trout.

5. The method of controlling sea lamprey by adding to a sea lamprey larvae habitat containing sea lamprey larvae a larvicidal amount of a 5-nitrohalosalicylanilide having the formula

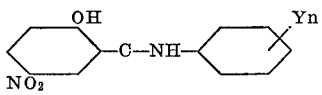

where Y is a halogen and $n$ is an integer no greater than 5.

6. The method of controlling sea lamprey as set forth in claim 5 by adding to a sea lamprey larvae habitat containing sea lamprey larvae a larvicidal amount of 2'-chloro-5-nitrosalicylanilide.

7. A method for controlling *Petromyzon marinus* lamprey comprising establishing, in cold water aquatic environments tributary to the Great Lakes of North America containing the *Petromyzon marinus* larvae and habitable by fresh water trout, a concentration of between 0.3 and 15 parts per million of a water-dispersible lamprecidal composition that is lethal to the larvae without more than about twenty-five percent trout mortality, said lamprecidal composition comprising a compound having the formula:

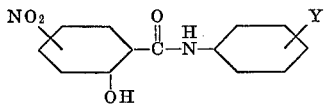

where Y is halogen.

8. The method of claim 7 in which the toxic compound is 4'-bromo-3-nitrosalicylanilide.

9. The method of claim 8 wherein the concentration of toxic compound employed is from about 0.3 to about 0.9 p.p.m.

10. The method of claim 7 in which the toxic compound is 2'-chloro-5-nitrosalicylanilide.

11. The method of claim 10 wherein the concentration of toxic compound employed is from about 0.9 to about 3.0 p.p.m.

12. The method of claim 7 in which the toxic compound is 4'-chloro-5-nitrosalicylanilide.

13. The method of claim 12 wherein the concentration of toxic compounds is from about 0.5 to about 1.0 p.p.m.

14. The method of claim 7 in which the toxic compound is 4'-chloro-3-nitrosalicylanilide.

15. The method of claim 14 wherein the concentration of toxic compound is from about 0.3 to 0.7 p.p.m.

16. The method of claim 7 in which the toxic compound is 4'-bromo-5-nitrosalicylanilide.

17. The method of claim 16 wherein the concentration of toxic compound is from about 0.5 to about 1.0 p.p.m.

18. The method of claim 7 in which the toxic compound is 4'-iodo-5-nitrosalicylanilide.

19. The method of claim 18 wherein the concentration of toxic compound is from about 0.5 to about 1.0 p.p.m.

20. The method of claim 1 in which the toxic compound is 3'-chloro-3-nitrosalicylanilide.

21. The method of claim 20 wherein the concentration of toxic compound is from about 0.3 to about 1.0 p.p.m.

22. A method for controlling *Petromyzon marinus* lamprey which inhabit the Great Lakes of North America and waters tributary thereto which comprises, establishing in aquatic environments containing the *Petromyzon marinus* larvae and habitable by fresh water trout, a concentration between about 0.3 and 15 parts per million of a water-dispersible lamprecidal composition that is lethal to the larvae without more than twenty-five percent trout mortality, said lamprecidal composition comprising a compound having the formula:

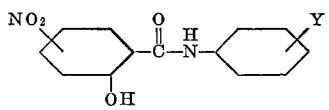

where Y is a halogen.

References Cited

UNITED STATES PATENTS

| | | | |
|---|---|---|---|
| 3,079,297 | 2/1963 | Schraufstatter | 424—230 |
| 3,113,067 | 12/1963 | Strufe et al. | 424—230 |
| 3,147,300 | 9/1964 | Schraufstatter | 260—479 |
| 3,238,098 | 3/1966 | Howell et al. | 424—230 |
| 3,278,372 | 10/1966 | Taborsky | 424—230 |
| 3,309,267 | 3/1967 | Starkey | 424—230 |

S. K. ROSE, Primary Examiner